United States Patent
Tsukamoto

(10) Patent No.: US 10,086,712 B2
(45) Date of Patent: Oct. 2, 2018

(54) CHARGING APPARATUS AND NON-CONTACT POWER FEEDING APPARATUS

(71) Applicant: NISSAN MOTOR CO., LTD., Yokohama-shi, Kanagawa (JP)

(72) Inventor: Yukinori Tsukamoto, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 8 days.

(21) Appl. No.: 14/392,196

(22) PCT Filed: May 30, 2014

(86) PCT No.: PCT/JP2014/064465
§ 371 (c)(1),
(2) Date: Dec. 23, 2015

(87) PCT Pub. No.: WO2014/208273
PCT Pub. Date: Dec. 31, 2014

(65) Prior Publication Data
US 2016/0159226 A1 Jun. 9, 2016

(30) Foreign Application Priority Data
Jun. 26, 2013 (JP) .................................. 2013-133438

(51) Int. Cl.
*B60L 11/18* (2006.01)
*H02J 50/90* (2016.01)
(Continued)

(52) U.S. Cl.
CPC ............... *B60L 11/182* (2013.01); *B60L 3/00* (2013.01); *B60L 11/1838* (2013.01);
(Continued)

(58) Field of Classification Search
CPC ....... B60L 11/182; B60L 11/1838; H02J 7/025; H02J 7/0029; H02J 50/90
(Continued)

(56) References Cited

U.S. PATENT DOCUMENTS

| 8,624,548 B2 | 1/2014 | Yamazaki et al. |
| 9,114,718 B2 | 8/2015 | Yamazaki et al. |
| 9,457,678 B2 | 10/2016 | Niizuma |
| 2009/0085522 A1 | 4/2009 | Matsumoto |
| 2012/0062172 A1* | 3/2012 | Takada .................. B60L 11/182 320/108 |

(Continued)

FOREIGN PATENT DOCUMENTS

| EP | 2 556 986 A2 | 2/2013 |
| JP | 08-237890 A | 9/1996 |

(Continued)

*Primary Examiner* — Isaac G Smith
(74) *Attorney, Agent, or Firm* — Foley & Lardner LLP

(57) ABSTRACT

There is provided a vehicle-side charging apparatus disposed in a vehicle (2). The charging apparatus includes a power receiving coil (21) which receives power from a power transmitting coil (11) disposed in a power feeding apparatus (1) in a non-contacting manner through at least magnetic coupling, a battery (25) which is charged by reception power of the power receiving coil (21), and a vehicle-side controller (20) which controls battery charge of the battery and outputs a command of a power feeding amount to the power feeding apparatus. The power feeding amount is an amount of power feeding from the power transmitting coil to the power receiving coil. The vehicle-side controller (20) determines whether or not the vehicle (2) is to be started. The vehicle-side controller (20) outputs a command for decreasing the power feeding amount to the power feeding apparatus (1) when the vehicle-side controller (20) determines that the vehicle (2) is to be started during the power feeding from the power transmitting coil (11) to the power receiving coil (21).

1 Claim, 4 Drawing Sheets

(51) Int. Cl.
 *H02J 50/10* (2016.01)
 *H02J 5/00* (2016.01)
 *H02J 7/02* (2016.01)
 *B60L 3/00* (2006.01)
 *B60L 15/20* (2006.01)

(52) U.S. Cl.
 CPC .......... *B60L 15/2072* (2013.01); *H02J 5/005* (2013.01); *H02J 7/025* (2013.01); *H02J 50/10* (2016.02); *H02J 50/90* (2016.02); *B60L 2240/28* (2013.01); *Y02T 10/645* (2013.01); *Y02T 10/7005* (2013.01); *Y02T 10/7072* (2013.01); *Y02T 10/72* (2013.01); *Y02T 10/7275* (2013.01); *Y02T 90/121* (2013.01); *Y02T 90/122* (2013.01); *Y02T 90/128* (2013.01); *Y02T 90/14* (2013.01); *Y02T 90/163* (2013.01)

(58) Field of Classification Search
 USPC .......................................................... 701/22
 See application file for complete search history.

(56) References Cited

U.S. PATENT DOCUMENTS

| | | | |
|---|---|---|---|
| 2012/0153717 A1 | 6/2012 | Obayashi et al. | |
| 2014/0021913 A1* | 1/2014 | Martin | B60L 11/1838 |
| | | | 320/109 |

FOREIGN PATENT DOCUMENTS

| | | | | |
|---|---|---|---|---|
| JP | 08-308022 A | 11/1996 | | |
| JP | 2005-073313 A | 3/2005 | | |
| JP | 2010-93957 A | 4/2010 | | |
| JP | 2010093957 A | * 4/2010 | ........... | B60L 11/182 |
| JP | 2011-035953 A | 2/2011 | | |
| JP | 2012-005226 A | 1/2012 | | |
| JP | 5081783 B2 | 11/2012 | | |
| JP | 2013-038991 A | 2/2013 | | |
| KR | 10-2011-0091478 A | 8/2011 | | |
| WO | WO 2010/090333 A1 | 8/2010 | | |
| WO | WO 2013/039160 A1 | 3/2013 | | |

* cited by examiner

US 10,086,712 B2

CHARGING APPARATUS AND NON-CONTACT POWER FEEDING APPARATUS

TECHNICAL FIELD

The present invention relates to a charging apparatus and a non-contact power feeding apparatus.

The present application claims priority based on Patent Application No. 2013-133438 filed in Japan Patent Office on Jun. 26, 2013. For those designated countries which permit the incorporation by reference, the contents described and/or illustrated in the above application are incorporated by reference in the present application as a part of the description and/or drawings of the present application.

BACKGROUND ART

A power feeding station including a first coil, a feeding power supply, a power supply control device and a feeding command unit is installed on the ground side. A second coil, a charging control circuit and a battery are mounted on the vehicle side. Then, when the battery is to be charged, a driver drives and stops the vehicle such that the second coil is right above the first coil. The power supply control device outputs a control signal to the feeding power supply in accordance with an operation of the feeding command unit, and the feeding power supply supplies an AC exciting current to the first coil, whereby an induced magnetic flux is generated. According to this induced magnetic flux, an AC induced electromotive force is induced in the second coil, the charging control circuit converts the AC induced electromotive force into a DC current, and the DC current is supplied to the battery. A non-contact power feeding apparatus for charging the battery constituted as above has been disclosed (Patent Document 1).

PRIOR ART DOCUMENT

Patent Document

[Patent Document 1] JP 1996-237890 A

SUMMARY OF INVENTION

Problems to be Solved by Invention

However, when the vehicle is started during the charge of the battery in the above-described non-contact power feeding apparatus, the power transmitting efficiency decreases due to a positional deviation between the first coil and the second coil. The power feeding station maintains output in the state of low power transmitting efficiency by increasing a voltage applied to the coil. Thus, there is a problem in that a high load is applied to a circuit of the power transmitting unit.

An object of the present invention is to provide a charging apparatus or a non-contact power feeding apparatus which is able to prevent applying a high load to a circuit of the power transmitting unit when the vehicle is started during power feeding from a power transmitting coil to a power receiving coil.

Means for Solving Problems

The present invention achieves the above objection by executing control to decrease a power feeding amount from the power transmitting coil to the power receiving coil, when a controller determines that the vehicle is to be started during power feeding from a power transmitting coil to a power receiving coil in a non-contacting manner.

Effect of the Invention

According to the present invention, at the time that the power transmitting efficiency between a power transmitting coil and a power receiving coil is decreased by start of the vehicle, the power feeding apparatus controls the circuit of the power transmitting unit on the basis of the decreased power feeding amount. Therefore, it is possible to prevent applying a high voltage or a high load to a circuit on the power transmitting unit.

MODE(S) FOR CARRYING OUT THE INVENTION

Hereinafter, an embodiment of the present invention will be described with reference to the drawings.

Figure 1:
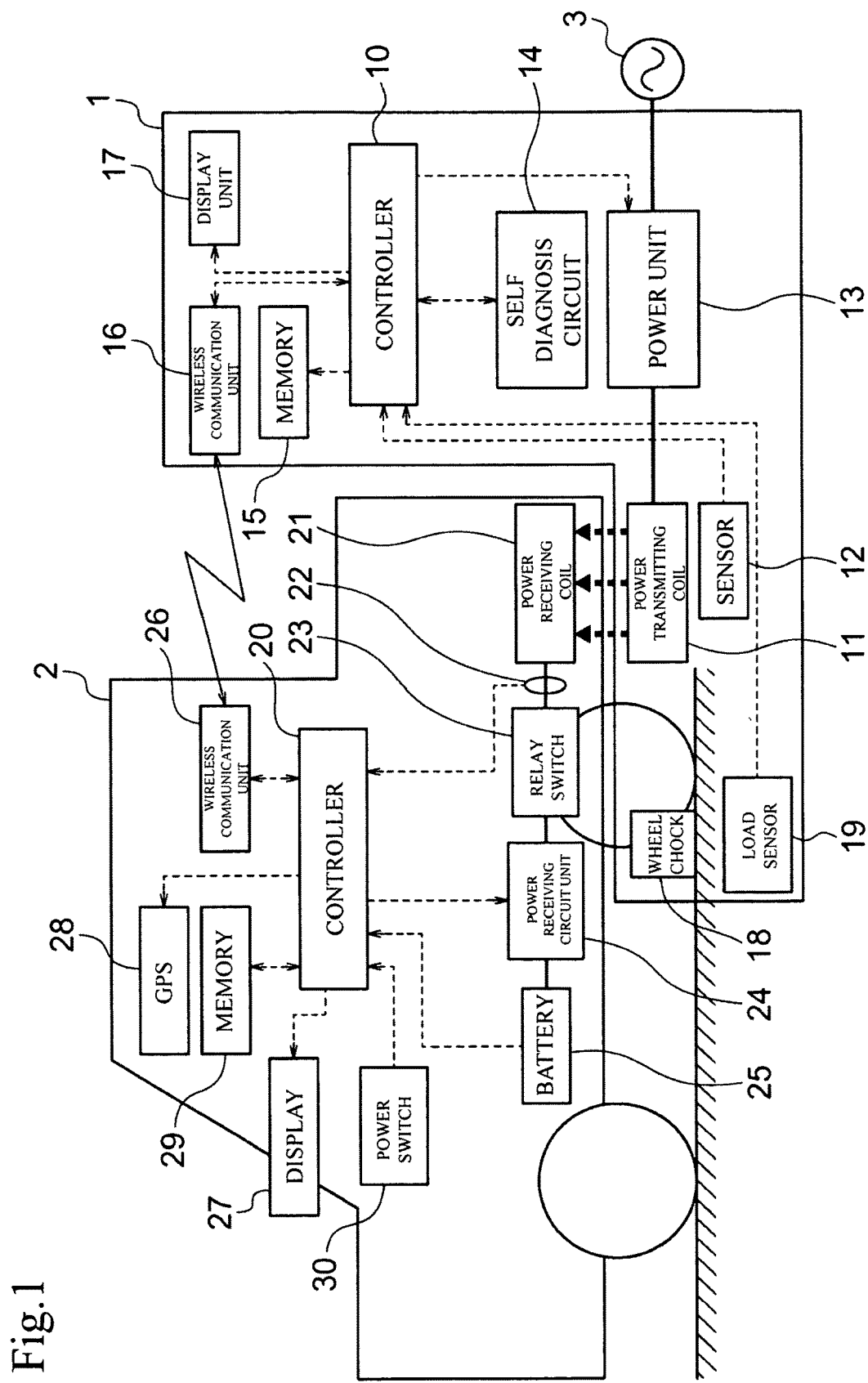
FIG. 1 is a block diagram of a non-contact power feeding system according to an embodiment of the present invention.

FIG. 1 is a block diagram of a non-contact power feeding system according to an embodiment of the present invention. The non-contact power feeding system according to the embodiment supplies power from a power transmitting coil to a power receiving coil in a non-contact manner through at least magnetic coupling. The power transmitting coil is a coil of a power feeding apparatus which is disposed on the ground side, and the power receiving coil is arranged in the vehicle side. Then, this system charges a battery of the vehicle with power received by the power receiving coil.

The non-contact power feeding system is disposed, for example, at a house parking lot or a parking lot in a public parking facility such as a parking lot in a highway or the like. The non-contact power feeding system includes a vehicle 2 and a power feeding apparatus 1. The power feeding apparatus 1 is disposed on a parking space in which the vehicle 2 is parked. The power feeding apparatus is a unit arranged on the ground side and supplies power through non-contact power feeding between coils under the condition that the vehicle 2 is parked at a predetermined park position. The vehicle 2 is an electric vehicle, a plugin hybrid vehicle, or the like and includes a battery. This battery can be charged by an external power supply. The vehicle 2 includes a charging device used for charge of a battery 25.

Hereinafter, the configuration of the power feeding apparatus 1 and the configuration of the vehicle 2 in the non-contact power feeding system will be described. In the embodiment of the present invention, the vehicle 2 will be described as an electric vehicle. In FIG. 1, dotted-line arrows represent signal lines between a controller 10 and the internal configuration of the power feeding apparatus 1, and signal lines between a controller 20 and the internal configuration of the vehicle 2. Thick lines represent power lines used when the battery 25 is charged by the power of an AC power supply 3.

The power feeding apparatus 1 includes the controller 10, a power transmitting coil 11, a sensor 12, a power unit 13, a self diagnosis circuit 14, a memory 15, a wireless communication unit 16, a display unit 17, a wheel chock 18, and a load sensor 19.

The controller 10 is a main controller for controlling the overall operation of the power feeding apparatus 1. The configuration of the controller 10 will be described below.

The power transmitting coil 11 is magnetically coupled with the power receiving coil 21 disposed in the vehicle 2 side and supplies power to the power receiving coil 21 in a non-contact manner. The power transmitting coil 11 is formed in a circular shape parallel to the power receiving coil 21. The power transmitting coil 11 is arranged in a parking space on which the non-contact power feeding apparatus of the embodiment is installed. The sensor 12 detects a relative position of the power receiving coil 21 with respect to the power transmitting coil 11. The sensor is a sensor such as, for example, an image sensor of a camera or the like, or an infrared sensor. The sensor 12 outputs a detection value to the controller 10.

The power unit 13 is a circuit which converts AC power transmitted from the AC power supply 3 into high-frequency AC power and transmits the converted AC power to the power transmitting coil 11. The power unit 13 includes a rectifier unit, a power factor correction (PFC) circuit, an inverter, and a sensor for detecting the output value which is output to the power transmitting coil 11. The controller 10 controls a switching device of the inverter included in the power unit 13 through a PWM control process so as to output desired power from the power unit 13 to the power transmitting coil 11.

The self diagnosis circuit 14 diagnoses abnormalities such as a break of a wiring, a detection failure of the sensor 12, and a ground fault of a power supply system for non-contact power feeding, or the like. The system wiring for the non-contact power feeding is a wiring extending from the AC power supply 3 to the power transmitting coil 11 through the power unit 13, and the like. The self diagnosis circuit 14 outputs a diagnosis result to the controller 10.

The memory 15 records identification (ID) information and information transmitted from the vehicle 2 side. This identification information is preliminarily given to each power feeding apparatus 1. The wireless communication unit 16 is a transceiver and bi-directionally communicates with a wireless communication unit 26 on the vehicle 2 side. A frequency used between the wireless communication unit 16 and the wireless communication unit 26 is set to a communication frequency which is different from a frequency used by vehicle peripheral devices such as an intelligent key. Accordingly, the vehicle peripheral devices are less likely to be interfered by the communication between the wireless communication unit 16 and the wireless communication unit 26. The vehicle peripheral device is, for example, an intelligent key. For the communication between the wireless communication unit 16 and the wireless communication unit 26, for example, any one of various wireless LAN systems is used.

The display unit 17 is a display device which notifies the state of the power feeding apparatus 1 to the outside. The display unit 17 is configured by a lamp, a display, or the like.

The wheel chock 18 is a mechanical mechanism and stops the rotation of a vehicle wheel during the power feeding from the power transmitting coil 11 to the power receiving coil 21. The wheel chock 18 is disposed in a parking space on the ground. The load sensor 19 detects a load (pressure) applied to the wheel chock 18. When the vehicle starts from a state in which the rotation of the vehicle wheel is stopped by the wheel chock 18, the vehicle wheel rotates and rides on the wheel chock. When the vehicle wheel rides on the wheel chock 18, the load sensor 19 detects pressure applied to the load sensor 19 and outputs a detection value to the controller 10.

Next, the configuration of the vehicle 2 will be described. The vehicle 2 includes a controller 20, the power receiving coil 21, a sensor 22, a relay switch 23, a power receiving circuit unit 24, a battery 25, the wireless communication unit 26, a display 27, a GPS receiver 28, a memory 29, and a power switch 30.

The controller 20 is not limited to execute the charging control process at the time of charging the battery 25 but executes various control processes in an Electric Vehicle (EV) system of the vehicle.

The power receiving coil 21 is disposed at the bottom (chassis) or the like of the vehicle 2 and is disposed between rear vehicle wheels. When the vehicle 2 is parked at a predetermined park position, the position of the power receiving coil 21 comes to a position above the power transmitting coil 11, and the position keeps a distance from the power transmitting coil 11. The power receiving coil 21 is a coil formed in a circular shape parallel to the surface of the parking space.

The sensor 22 detects a current and a voltage output from the power receiving coil 21 to the battery 25. The sensor 22 outputs a detection value to the controller 20. The relay switch 23 switches between On/Off under the control of the controller 20. The relay switch 23 is connected between the power receiving coil 21 and the battery 25. When the battery 25 is charged through non-contact power feeding, the relay switch 23 turns On.

The power receiving circuit unit 24 is connected between the power receiving coil 21 and the battery 25. The power receiving circuit unit 24 includes, for example, a conversion circuit which converts AC power received by the power receiving coil 21 into DC power, and a rectifier circuit.

The battery 25 includes a plurality of secondary cells which are connected in series or parallel. The secondary cell is a lithium ion battery or the like. The battery 25 is electrically connected to the power receiving coil 21 through the relay switch 23 and the power receiving circuit unit 24. The battery 25 outputs power to a motor (not illustrated in the figure) which is a power source of the vehicle 2 through the inverter. In addition, the battery 25 is charged by reception power which is received by the power receiving coil 21.

The wireless communication unit 26 is a transceiver used for wirelessly communicating with the wireless communication unit 16 on the power feeding apparatus 1 side. The display 27 is disposed in, for example, an instrument panel of the vehicle 2. The display 27 displays a map of a navigation system, an image captured by a camera in a parking supporting system, or the like. The display 27 displays the state of the power feeding apparatus 1 and displays the position of the power feeding apparatus 1 on the map. When the battery 25 is charged by the power feeding apparatus 1, the display 27 displays a guidance for charge.

The GPS (global positioning system) receiver 28 receives signals transmitted from satellites and measures the current position of the vehicle 2. The memory 29 is a recording medium which records the identification information (ID)

and information transmitted from the power feeding apparatus 1 side. This identification information is assigned to each vehicle in advance.

The power switch 30 is a switch used for switching among a Ready state, an On state, an Acc state, and an Off state. The power switch 30 is a switch operated by a driver. The Ready state represents a state in which the vehicle can travel. The On state represents a state in which the vehicle cannot travel, the battery 25 or the like supplies power to the controller 20, and all the electrical components of the vehicle 2 can be used. The Acc state represents a state in which the vehicle cannot travel and only some electrical components among all the electrical components arranged of the vehicle 2 can be used. The Off state represents a state in which the vehicle cannot travel and all the electrical components cannot be used.

Figure 2:
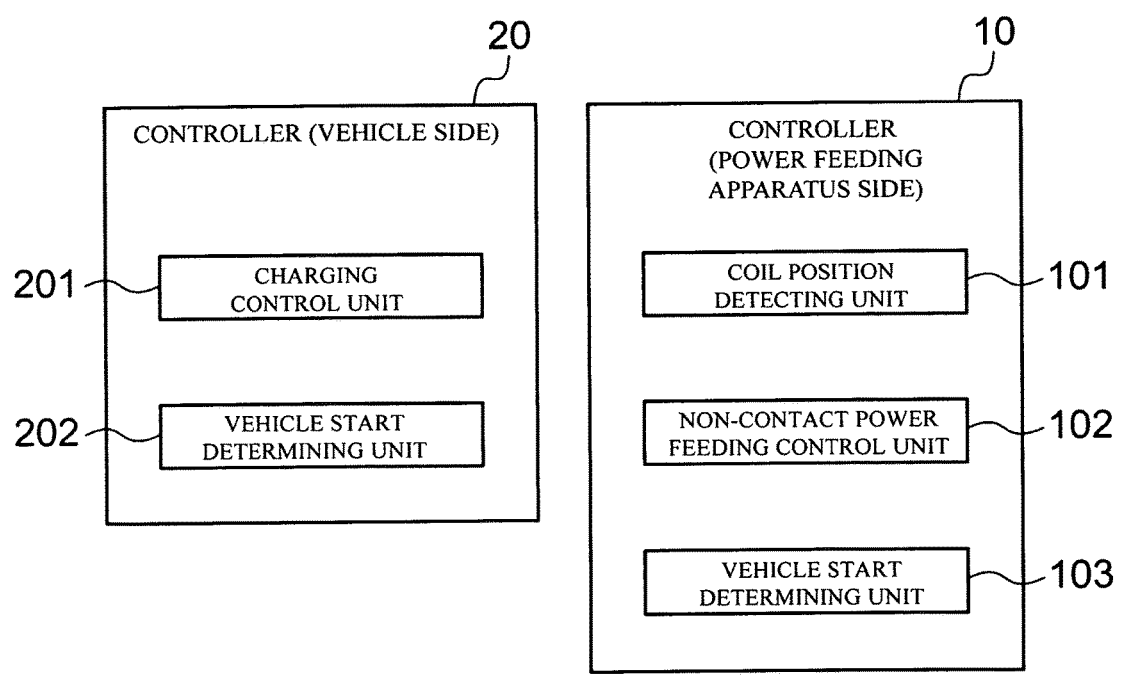
FIG. 2 is a block diagram of a controller on the vehicle side and a controller on the power feeding apparatus side in FIG. 1.

Next, the configuration of the controller 10 on the power feeding apparatus 1 side and the configuration of the controller 20 on the vehicle 2 side will be described with reference to FIGS. 1 and 2.

The controller 10 includes a coil position detecting unit 101, a non-contact power feeding control unit 102, and a vehicle start determining unit 103.

The coil position detecting unit 101 detects a relative position of the power receiving coil 21 with respect to the power transmitting coil 11 by using the sensor 12.

The non-contact power feeding control unit 102 controls the power unit 13 on the basis of a signal received from the wireless communication unit 16. Then according to the control by the non-contact power feeding control unit 102, the power unit 13 outputs the power of the AC power supply 3 to the power transmitting coil 11, thereby controlling the charge of the battery 25. The non-contact power feeding control unit 102 acquires information of a power feeding amount through wireless communication between the wireless communication unit 16 and the wireless communication unit 26. The information of the power feeding amount is information which is requested from the vehicle 2 side. The non-contact power feeding control unit 102 controls the power unit 13 to outputs power from the power transmitting coil 11 to the power receiving coil 21 on the basis of the acquired power feeding amount.

The vehicle start determining unit 103 determines whether or not the vehicle is to be started on the basis of a detection value of the load sensor 19 during the power feeding from the power transmitting coil 11 to the power receiving coil 21.

The controller 20 includes a charging control unit 201 and a vehicle start determining unit 202.

The charging control unit 201 manages the charging state of the battery 25 on the basis of a detection value of a sensor detecting a voltage or a current of the battery 25 and controls the power receiving circuit unit 24 so as to control the charge of the battery 25.

The vehicle start determining unit 202 determines whether or not the vehicle is to be started on the basis of the state of the power switch 30 during power feeding from the power transmitting coil 11 to the power receiving coil 21.

Next, the control of the controller 10 and the controller 20 will be described. First, the described control processes as below are executed after the vehicle 2 parks in a parking space of the power feeding apparatus 1 until the charge of the battery 25 is normally completed.

As the vehicle 2 is parked in the parking space of the power feeding apparatus 1 and a start button of the power feeding apparatus 1 is operated, or as the vehicle 2 is parked in the parking space of the power feeding apparatus 1 and the wireless communication unit 16 receives a startup signal transmitted from the vehicle 2, the power feeding apparatus 1 starts to operate. The coil position detecting unit 101 of the controller 10 on the power feeding apparatus side detects a positional deviation of the power receiving coil 21 with respect to the power transmitting coil 11 on the basis of the detection value of the sensor 12. The coil position detecting unit 101 determines whether or not the positional deviation of the coil is within an allowance range. When the positional deviation of the coil is outside the allowance range, the coil position detecting unit 101 urges to change the park position of the vehicle 2 by displaying a mark of re-parking on the display unit 17 so that the coil position of the power receiving coil 21 corresponds to the position of the power transmitting coil 11. Alternatively, the coil position detecting unit 101 urges to change the park position of the vehicle 2 by transmitting a signal representing a large positional deviation between the coils to the vehicle 2 side by using the wireless communication unit 16.

On the other hand, when the positional deviation of the coil is within the allowance range, the coil position detecting unit 101 transmits a signal representing a power feedable state to the vehicle 2 side.

When the controller 20 receives the signal, the controller 20 checks the state of the power switch 30. When the power switch 30 is switched from the Ready state to the Off state or when the state of the power switch 30 is switched from the On state to the Off state, the controller 20 causes the battery 25 to be in a chargeable state by switching the relay switch 23 from the Off state to the On state. Then, the charging control unit 201 of the controller 20 detects a state of charge of the battery 25 before the start of charge of the battery 25.

The charging control unit 201 calculates charging power which is appropriate to the state of the battery 25 in accordance with the state of charge of the battery 25. The charging control unit 201 calculates the power feeding amount from the power transmitting coil 11 to the power receiving coil 21. The power feeding amount is an amount of power feeding for outputting the charging power of the battery 25 from the power receiving circuit unit 24. The charging control unit 201 transmits a signal of a command of the calculated power feeding amount to the power feeding apparatus 1 side with the wireless communication unit 26.

The relation between the charging power of the battery 25 and the power feeding amount commanded to the power feeding apparatus 1 side is stored in advance as a control map or the like. The charging control unit 201 calculates the power feeding amount by referring to the control map. The power feeding amount, for example, is represented by the reception power of the power receiving coil 21, a voltage applied to the power receiving coil 21, a current flowing through the power receiving coil 21, or a conduction time of the power receiving coil 21.

When the signal of the command of the power feeding amount is received, the non-contact power feeding control unit 102 of the controller 10 on the power feeding apparatus 1 side calculates transmission power of the power transmitting coil 11 in accordance with the coupling state between the power transmitting coil 11 and the power receiving coil 21. Here, the transmission power is power which is used for feeding the power feeding amount requested from the vehicle 2 side to the power receiving coil. The non-contact power feeding control unit 102 may calculate the coupling state (coupling coefficient) between the power transmitting coil 11 and the power receiving coil 21 by using a positional deviation between the coils 11, 21. The positional deviation is represented by the detection value of the sensor 12. In addition, the non-contact power feeding control unit 102 may calculate the coupling state (coupling coefficient) by using the voltage or the current of the power transmitting coil 11 at the time of power feeding from the power transmitting coil 11 to the power receiving coil 21.

The non-contact power feeding control unit 102 controls the power unit 13, and the power unit 13 outputs the calculated transmission power from the power transmitting coil 11.

When the power is fed from the power transmitting coil 11 to the power receiving coil 21, the controller 20 determines whether or not an actual power feeding amount from the power transmitting coil 11 to the power receiving coil 21 is equal to the power feeding amount commanded to the power feeding apparatus 1 side on the basis of the detection value of the sensor 22. When the actual power feeding amount is different from the commanded power feeding amount, the charging control unit 201 transmits a signal representing a difference between the actual power feeding amount and the commanded power feeding to the power feeding apparatus 1 side.

In addition, the charging control unit 201 controls the power receiving circuit unit 24 so that the power received by the power receiving coil 21 comes to the charging power of the battery 25. Then, the battery is charged with the charging power. During the charge of the battery 25, the charging control unit 201 manages the state of charge of the battery 25.

When the state of charge of the battery 25 approaches a target value, the charging control unit 201 decreases the output power which is output to the battery 25 from the power receiving circuit unit 24 by controlling the power receiving circuit unit 24. Then, when the state of charge of the battery 25 reaches the target value, the charging control unit 201 transmits a stop signal for ending the power feeding to the power feeding apparatus 1 side, and then the relay switch 23 is switched to the Off state. When the controller 10 receives the stop signal indicating the end of the power feeding, the controller 10 on the power feeding apparatus 1 side sets the output of the power transmitting coil 11 to zero by controlling the power unit 13. In addition, when the state of charge of the battery 25 approaches the target value, the charging control unit 201 may transmit a signal of a command for decreasing the power feeding amount from the power transmitting coil 11 to the power receiving coil 21 to the power feeding apparatus 1 side.

Next, the described control processes as below are executed when the vehicle 2 is to be started during the power feeding from the power transmitting coil 11 to the power receiving coil 21. The vehicle start determining unit 202 on the vehicle 2 side detects the state of the power switch 30 during the power feeding from the power transmitting coil 11 to the power receiving coil 21. As described above, when the battery 25 is charged through non-contact power feeding, the power switch 30 is in the Off state. In this state, when the power switch 30 is switched from the Off state to the Ready state by the driver operation of the power switch 30, there is a high possibility that the driver actually attempts to start the vehicle. For this reason, when switching of the power switch 30 from the Off state to the Ready state is detected, the vehicle start determining unit 202 determines that the vehicle is to be started. Here, the determination of the start of the vehicle includes not only a state in which the vehicle is actually started and the vehicle wheels rotate, but also a startable state in which the vehicle can be started before an actual start of the vehicle.

Meanwhile, when the battery 25 is charged by the non-contact power feeding system of the embodiment, since the vehicle and the power feeding facility arranged on the ground side are not connected by a cable or the like, the vehicle 2 can ride over the wheel chock 18 so as to be started. In addition, when there is no wheel chock 18, the vehicle 2 can be started more easily.

Then, when the vehicle 2 is started, a positional deviation between the power transmitting coil 11 and the power receiving coil 21 increases, and the power transmitting efficiency between the coils decreases. At this time, when the controller 10 on the power feeding apparatus 1 side controls the power unit 13 to maintain the power feeding amount from the power transmitting coil 11 to the power receiving coil 21, the voltage applied to the power transmitting coil 11 increases. Therefore, the load for the power transmitting coil 11 and the power unit 13 increases. In addition, when the voltage applied to the power transmitting coil 11 increases, the magnetic flux leakage also increases, whereby the efficiency is degraded.

For this reason, in the embodiment, when the vehicle start determining unit 202 determines that the vehicle is to be started, in order to decrease the power feeding amount, the charging control unit 201 transmits a power feeding stop signal to the power feeding apparatus 1 side. In other words, the charging control unit 201 transmits a power feeding stop command signal to the power feeding apparatus 1 side so that the power feeding amount is lower than the commanded power feeding amount commanded during the charge of the battery 25.

When the controller 10 receives the power feeding stop signal, the non-contact power feeding control unit 102 of the controller 10 sets the power feeding amount from the power transmitting coil 11 to the power receiving coil 21 to zero by setting the output from the power unit 13 to the power transmitting coil 11 to zero, thereby stopping the power feeding. Accordingly, when the vehicle is to be started during the power feeding from the power transmitting coil 11 to the power receiving coil 21, the output from the power unit 13 to the power transmitting coil 11 does not increase. As a result, the application of a high load to the power unit 13 and the power transmitting coil 11 is prevented, and reduction in the durability of the power feeding apparatus 1 due to the application of the high load can be avoided.

In addition, as described below, during the power feeding from the power transmitting coil 11 to the power receiving coil 21, the power feeding apparatus 1 determines whether or not the vehicle is to be started and executes control of decreasing the power feeding amount on the basis of a result of the determination.

The vehicle start determining unit 202 on the power feeding apparatus 1 side determines whether or not the vehicle is to be started during the power feeding from the power transmitting coil 11 to the power receiving coil 21 on the basis of the detection value of the load sensor 19. More specifically, the vehicle start determining unit 202 compares the detection value of the load sensor 19 with a predetermined threshold. When the detection value is larger than the predetermined threshold, the vehicle start determining unit 202 determines that the vehicle 2 is to be started. On the other hand, when the detection value is the predetermined threshold or less, the vehicle start determining unit 202 determines that the vehicle 2 is not to be started.

When it is determined that the vehicle 2 is to be started, the non-contact power feeding control unit 102 sets the power feeding amount from the power transmitting coil 11 to the power receiving coil 21 to zero by setting the output from the power unit 13 to the power transmitting coil 11 to zero, thereby stopping the power feeding. Accordingly, when the power feeding apparatus 1 determines that the vehicle 2 is to be started, the power feeding apparatus 1 prevents the application of a high load to the power unit 13 and the power transmitting coil 11 due to the start of the vehicle 2.

Figure 3:
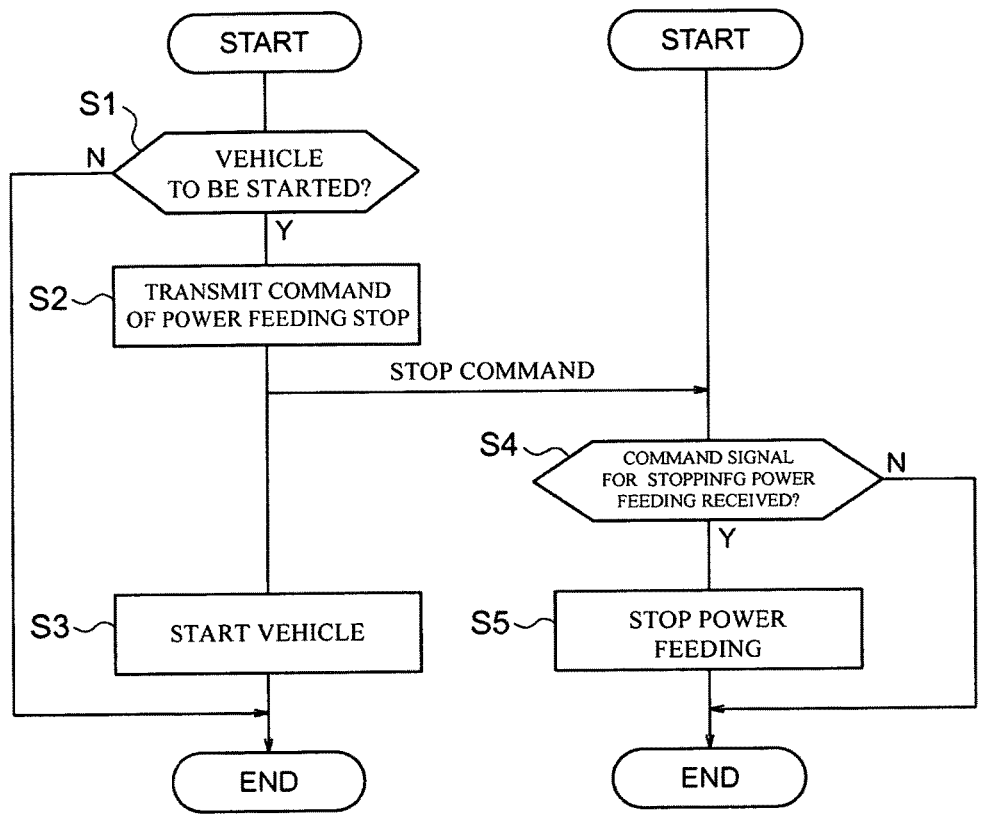
FIG. 3 is a flowchart illustrating the control sequence of the controller on the vehicle side and the controller on the power feeding apparatus side in FIG. 1.
Figure 4:
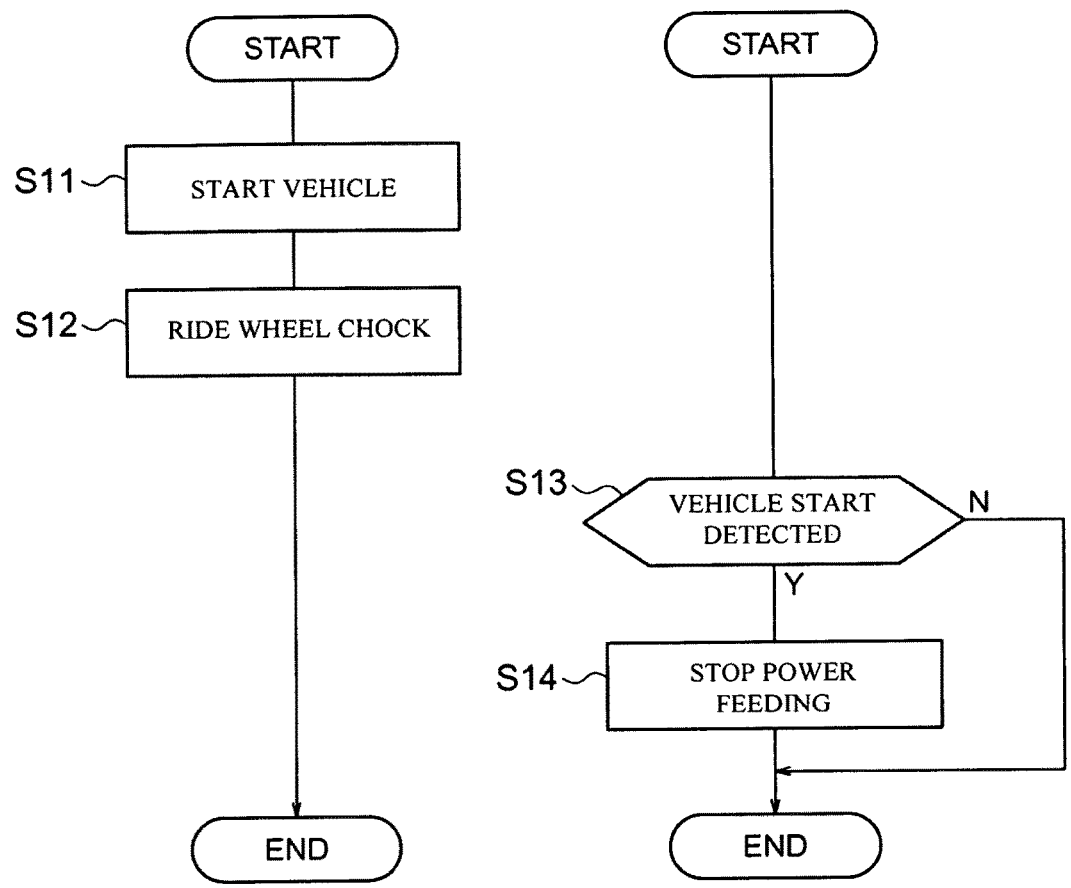
FIG. 4 is a flowchart illustrating the control sequence of the controller on the vehicle side and the controller on the power feeding apparatus side in FIG. 1.

Next, the control sequence executed by the controllers 10 and 20 will be described with reference to FIGS. 3 and 4. FIG. 3 is a flowchart illustrating the control sequence of the controllers 10 and 20 when the vehicle 2 side determines whether the vehicle 2 is to be started. FIG. 4 is a flowchart illustrating the control sequence of the controllers 10 and 20 when the power feeding apparatus 1 side determines whether the vehicle 2 is to be started.

As illustrated in FIG. 3, in Step S1, the vehicle start determining unit 102 of the controller 10 on the vehicle 2 side determines whether or not the vehicle 2 is to be started by detecting the state of the power switch 30. When the vehicle start determining unit 102 determines that the vehicle 1 is not to be started, the control flow ends.

On the other hand, when the vehicle start determining unit 102 determines that the vehicle 1 is to be started, in Step S2, the controller 10 wirelessly transmits a power feeding stop command signal (stop signal) to the power feeding apparatus 1 side. In Step S3, the controller 10 actually starts the vehicle 2. Then, the control flow ends.

On the power feeding apparatus 1 side, in Step S4, the controller 10 determines whether or not a power feeding stop command signal has been received. When the stop signal has not been received, the control process ends. On the other hand, when the stop signal has been received, in Step S5, the non-contact power feeding control unit 102 of the controller 10 stops the power feeding by controlling the power unit 13. Then, the control flow ends.

As illustrated in FIG. 4, on the vehicle 2 side, in Step S11, the controller 10 actually starts the vehicle 2. In Step S12, the vehicle wheel of the vehicle 2 rides on the wheel chock 18. Then, the control flow of the vehicle side illustrated in FIG. 4 ends.

On the power feeding apparatus 1 side, in Step S13, the vehicle start determining unit 103 of the controller 10 determines whether or not the vehicle is to be started on the basis of the detection value of the load sensor 19. When the vehicle start determining unit 103 determines that the vehicle is to be started, the control flow ends. On the other hand, when the vehicle start determining unit 103 determines that the vehicle is not to be started, in Step S14, the non-contact power feeding control unit 102 of the controller 10 stops the power feeding by controlling the power unit 13, then, the control flow ends.

As described above, in the embodiment, the controller 10 on the vehicle 2 side determines whether or not the vehicle 2 is to be started during the power feeding from the power transmitting coil 11 to the power receiving coil 21. When the controller 10 determines that the vehicle 2 is to be started, the controller 10 outputs a command for decreasing the power feeding amount to the power feeding apparatus 1. Accordingly, also when the vehicle 2 is started during the non-contact power feeding, the application of a high load to the circuit on the power feeding apparatus 1 side can be prevented. As a result, the circuit on the power feeding apparatus 1 side can be protected. In addition, in the state in which the power transmitting efficiency is low, the voltage of the power transmitting coil 11 is not increased, and accordingly, an increase in the magnetic flux leakage between the coils can be prevented as well.

In addition, in the embodiment, the controller 20 determines whether or not the vehicle 2 is to be started on the basis of the state of the power switch 30. Accordingly, it is possible to determine whether or not the vehicle 2 is to be started by employing a simple configuration. In addition, since there is a time margin until the vehicle 2 actually travels after the power switch 30 is switched from the Off state to the Ready state, it is possible to set the power feeding amount to zero within the time, or it is possible to approach the power feeding amount to zero within the time. As a result, the circuit on the power feeding apparatus 1 side can be protected.

Furthermore, in the embodiment, the controller 10 on the power feeding apparatus 1 side determines whether or not the vehicle 2 is to be started during the power feeding from the power transmitting coil 11 to the power receiving coil 21. When the controller 10 determines that the vehicle 2 is to be started, the controller 10 controls to decrease the power feeding amount. Accordingly, also when the vehicle 2 is started during non-contact power feeding, the application of a high load to the circuit on the power feeding apparatus 1 side is prevented. As a result, the circuit on the power feeding apparatus 1 side can be protected. In addition, in the state in which the power transmitting efficiency is low, the voltage of the power transmitting coil 11 is not high, and accordingly, an increase in the magnetic flux leakage between the coils can be suppressed.

In addition, in the embodiment, the controller 10 determines whether or not the vehicle 2 is to be started on the basis of the detection value of the load sensor 19. When the controller 10 on the vehicle 2 side determines that the vehicle 2 is to be started, and a result of the determination is transmitted to the power feeding apparatus 1 side through wireless communication, there is a possibility that a time is required for the wireless communication. On the other hand, in the embodiment, since the determination is made using the detection value of the load sensor 19 disposed on the power feeding apparatus 1 side, it is possible to shorten a time lag until the determination of the start of the vehicle 2 to the decreasing of the power feeding amount.

Furthermore, as a modified example of the embodiment, the vehicle start determining unit 202 may determine whether or not the vehicle 2 is to be started on the basis of the position of the shift lever. When the vehicle 2 is to be started, the position of the shift lever is switched to a drive range (D range (drive range) or an R range (reverse range)). For this reason, when the position of the shift lever is switched to a position of the drive range, the vehicle start determining unit 202 determines that the vehicle 2 is to be started. Accordingly, it is possible to determine whether or not the vehicle 2 is to be started by employing a simple configuration.

In addition, as a modified example of the embodiment, the vehicle start determining unit 202 may determine whether or not the vehicle 2 is to be started on the basis of the opening/closing of a door of the vehicle 2. When the vehicle 2 is to be started, the user executes a door opening/closing operation for getting in the vehicle 2. For this reason, when the door becomes the closed state from the open state or when the door becomes the open state from the closed state, the vehicle start determining unit 202 determines that the vehicle 2 is to be started. Accordingly, it is possible to determine whether or not the vehicle 2 is to be started by employing a simple configuration, and it is possible to determine whether or not the vehicle 2 is to be started before the vehicle 2 actually starts traveling.

Furthermore, in the embodiment, when the controller 20 on the vehicle 2 side determines that the vehicle 2 is to be started, the controller 20 may output a command for decreasing the power feeding amount to the power feeding apparatus 1 instead of outputting the stop command to the power feeding apparatus 1. The stop command is a command for stopping the power feeding from the power transmitting coil 11 to the power receiving coil 21, and the command for decreasing the power feeding amount is a command for decreasing the power feeding amount with a non-zero amount.

In addition, in the embodiment, when the controller 10 arranged on the power feeding apparatus 1 side determines that the vehicle 2 is to be started, the controller 10 may execute control for decreasing the power feeding amount instead of the control for stopping the power feeding from the power transmitting coil 11 to the power receiving coil 21 at the time of controlling the power unit 13. The control for decreasing the power feeding amount is a control for decreasing the power feeding amount with a non-zero amount or a control for decreasing the power feeding amount to an amount lower than a power feeding amount which is set before the determination of start of the vehicle.

Furthermore, in the embodiment, while the function for determining whether or not the vehicle 2 is to be started is provided in the power feeding apparatus 1 and the vehicle 2, the function may be provided in any one of the power feeding apparatus 1 and the vehicle 2. In addition, in the embodiment, while the control function of decreasing the power feeding amount on the basis of a result of determining whether or not the vehicle 2 is to be started is provided in the power feeding apparatus 1 and the vehicle 2, the control function may be provided in any one of the power feeding apparatus 1 and the vehicle 2.

The controller 20 described above corresponds to a "vehicle-side controller" of the present invention, the power switch 30 corresponds to a "switch", and the controller 10 corresponds to a "controller" of the present invention.

DESCRIPTION OF REFERENCE NUMERALS

1 Power feeding apparatus
2 Vehicle
3 AC power supply
10 and 20 Controller
11 Power transmitting coil
12 Sensor
13 Power unit
16 Wireless communication unit
21 Power receiving coil
24 Power receiving circuit unit
25 Battery
26 Wireless communication unit
30 Power switch
101 Coil position detecting unit
102 Non-contact power feeding control unit
103 Vehicle start determining unit
201 Charging control unit
202 Vehicle start determining unit

The invention claimed is:

1. A charging apparatus disposed in a vehicle, the charging apparatus comprising:
a power receiving coil configured to receive power from a power transmitting coil disposed in a power feeding apparatus in a non-contacting manner through at least magnetic coupling in a state in which the power receiving coil is in a position above the power transmitting coil maintaining a distance from the power receiving coil to the power transmitting coil disposed on a parking space;
a battery charged by reception power of the power receiving coil;
a power switch switching among a ready state in which the vehicle can travel, an on state in which the vehicle cannot travel and electric components of the vehicle can be used, and an off state in which the vehicle cannot travel and the electric components cannot be used; and
a vehicle-side controller configured to control charge of the battery and outputting a command of a power feeding amount to the power feeding apparatus, the power feeding amount being an amount of power feeding from the power transmitting coil to the power receiving coil;
wherein the vehicle-side controller:
detects a state of the power switch during power feeding from the power transmitting coil to a power receiving coil,
determines whether or not the power switch switches from the off state to the on state or whether or not the power switch switches from the off state to the ready state during power feeding from the power transmitting coil to the power receiving coil; and
outputs a command for decreasing the power feeding amount to the power feeding apparatus when the power switch switches from the off state to the on state or when the power switch switches from the off state to the ready state during power feeding from the power transmitting coil to the power receiving coil.

* * * * *